A. BRIGDEN.
SPRING TOOTH CULTIVATOR.
APPLICATION FILED FEB. 14, 1911.
1,003,029.
Patented Sept. 12, 1911.
2 SHEETS—SHEET 1.
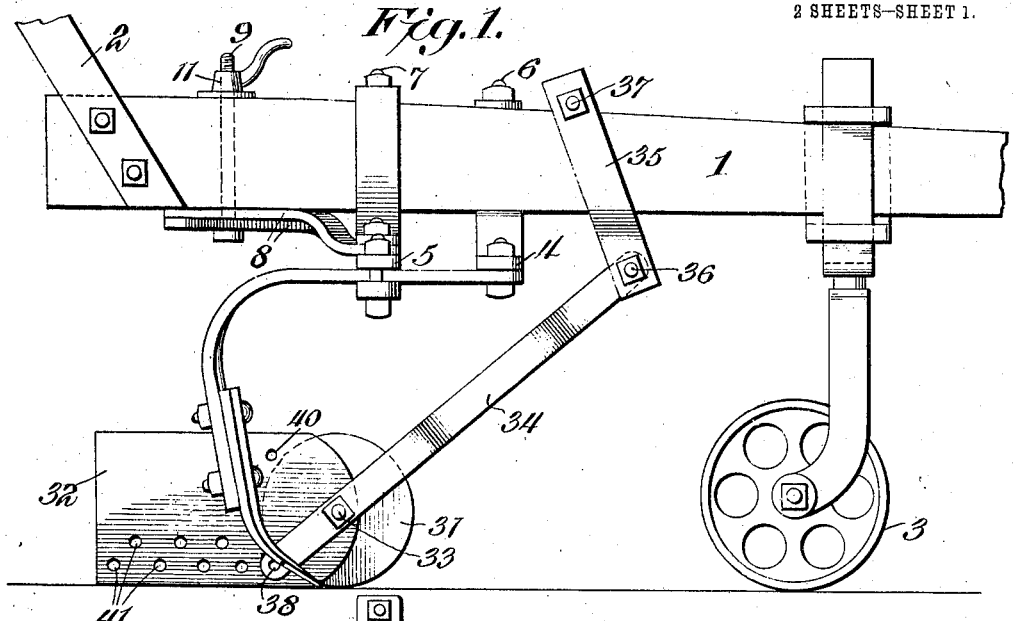
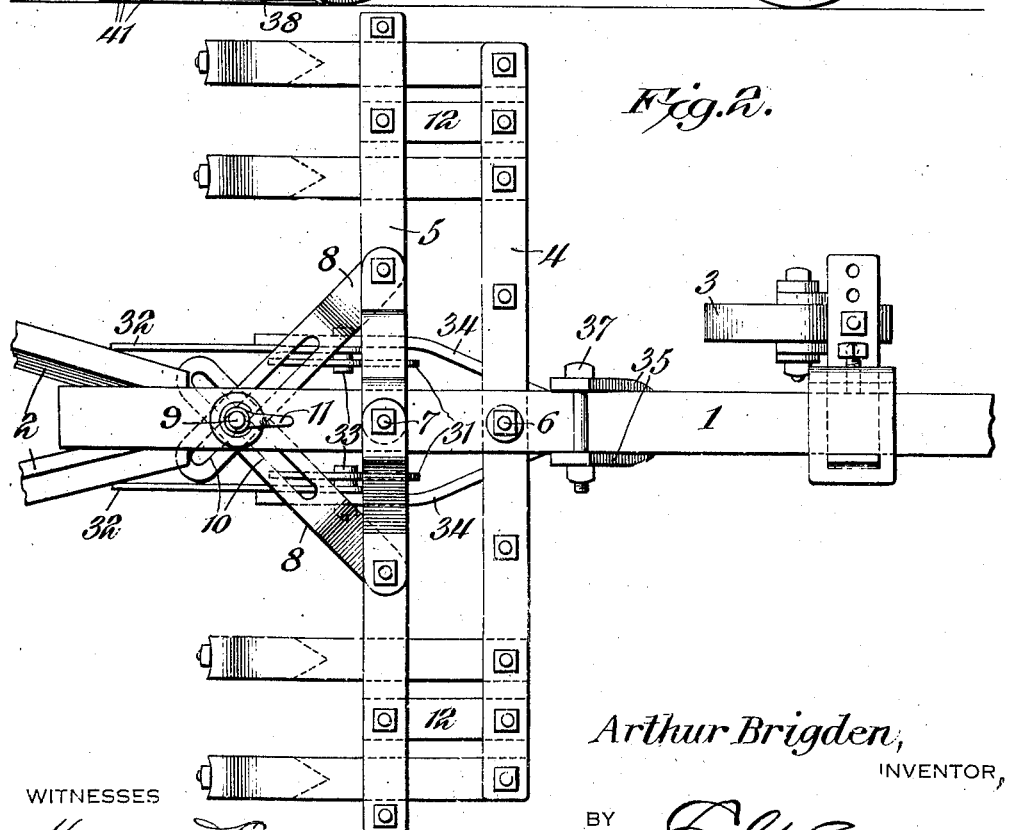
WITNESSES
Arthur Brigden,
INVENTOR,
BY
ATTORNEY A. BRIGDEN.
SPRING TOOTH CULTIVATOR.
APPLICATION FILED FEB. 14, 1911.
1,003,029.
Patented Sept. 12, 1911
2 SHEETS—SHEET 2.
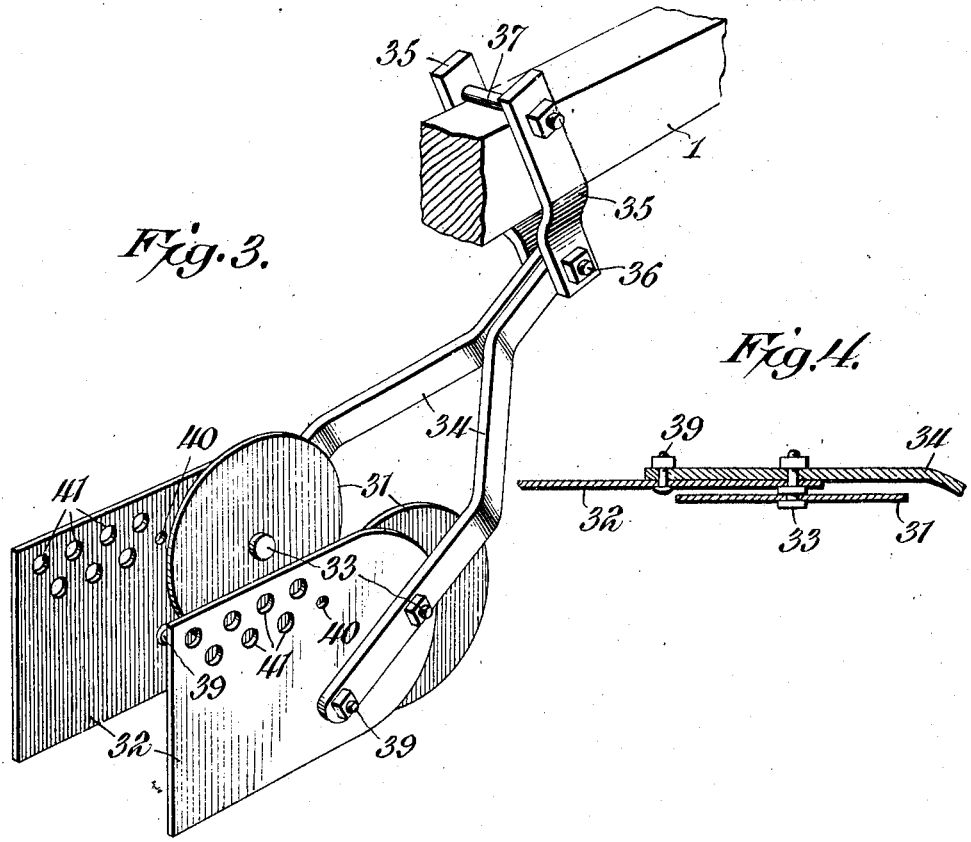
Arthur Brigden, INVENTOR
WITNESSES
BY
ATTORNEY

UNITED STATES PATENT OFFICE.

ARTHUR BRIGDEN, OF ALBERTVILLE, ALABAMA.

SPRING-TOOTH CULTIVATOR.

1,003,029.　　　　　Specification of Letters Patent.　　Patented Sept. 12, 1911.

Application filed February 14, 1911. Serial No. 608,527.

*To all whom it may concern:*

Be it known that I, ARTHUR BRIGDEN, a citizen of the United States, residing at Albertville, in the county of Marshall and State of Alabama, have invented a new and useful Spring-Tooth Cultivator, of which the following is a specification.

The invention relates to improvements in spring tooth cultivators.

The object of the present invention is to improve the construction of cultivators, and to provide a simple and inexpensive fender, adapted to be readily applied to the beam of a cultivator, and capable of effectively shielding the plants, and adapted to readily ride over stalks and other obstructions without dragging the same along the ground and tearing up cotton or other plants.

A further object of the invention is to provide a fender, adapted, when desired, to permit a small quantity of fine soil to sift through to the plants.

With these and other objects in view, the invention consists in the construction and novel combination, of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a cultivator, constructed in accordance with this invention. Fig. 2 is a plan view of the same. Fig. 3 is a perspective view of the fender, the plates being reversed. Fig. 4 is a sectional view of one side of the fender, the parts being arranged as shown in Fig. 3.

Like numerals of reference designate corresponding parts in all the figures of the drawings.

In the accompanying drawings in which is illustrated the preferred embodiment of the invention, 1 designates a cultivator beam, equipped at its rear end with handles 2 and supported at its front portion by a gage wheel 3 and having front and rear tooth carrying bars 4 and 5, extending laterally from opposite sides of its rear portion. The tooth carrying bars are pivoted to the cultivator beam by vertical bolts 6 and 7, and are adjustable backwardly and forwardly from a position at right angles to the beam, and they are secured in their adjustment by rearwardly converging braces 8, pivoted at their outer ends to the rear tooth carrying bars 5, and secured to the beam by a clamping bolt 9, operating in slots 10 of the braces 8 and provided at its upper end with a nut 11, having a handle to enable it to be readily adjusted. The laterally extending tooth carrying bars are connected at their outer portions by short bars or pieces 12.

The cultivator is equipped with a fender composed of opposite disks 31 and plates 32, extending rearwardly from the disks a sufficient distance to afford the desired protection to the plants. The plates are of a height nearly equal to the diameter of the disks, and their upper and lower edges are arranged in the same horizontal plane as the top and bottom of the said disks, and the disks and the plates form a continuous fender and prevent any soil from passing between the front ends of the plates and the rear portion of the disks to the plants. The disks are centrally pivoted by bolts 33 to inclined rearwardly diverging arms 34, pivoted at their upper ends between sides 35 of a clamp by a lower bolt 36. The sides 35 of the clamp are also connected by an upper bolt 37, the upper and lower bolts adjustably holding the sides of the clamp to the beam. The lower portions of the sides of the clamp are bent inwardly beneath the beam to arrange their lower ends closer together than their upper terminals, and the inclined arms or bars 34 are independently movable on the lower pivot bolt 36. This will permit the fenders to move upwardly and downwardly to enable them to ride over stalks and other obstructions.

The front ends of the plates 32 are preferably curved, as shown, and the disks 31 through their pivotal connection with the arms are adapted to readily roll over stalks without dragging the same and tearing up young plants, and the pivoting of the rearwardly extending side plates of the fender also enables the same to readily follow the disks over such obstructions. The lower portions of the arms or bars 34 extend downwardly and rearwardly beyond the pivots 33, and are provided with perforations 38, adapted to receive a bolt 39 for rigidly securing the side plates to the arms when desired. The side plates are provided at their upper and lower portions with perforations 40 to receive the bolts 39, and they are provided with a plurality of perforations 41, located at one half of each of the plates and adapted to permit fine soil to sift through the plates to the plants. The plates are also reversible to spring their imperforate portions at the bottom to prevent any of the soil from being thrown on the plants. By means of the bolts 39 the rearwardly extending plates of the fender may be rigidly held in position and by removing the bolts, the pivotal action of the plates heretofore described is permitted. The adjustment or reversal of the fender plates may be readily effected without detaching any of the other parts of the cultivator.

Having thus fully described my invention, what I claim as new and desire to secure by Letters Patent, is:—

1. A fender for cultivators including opposite pivotal disks, and opposite plates mounted on the pivots of the disks and extending rearwardly therefrom.

2. A fender for cultivators including inclined pivotally mounted arms provided at their lower portions with pivots, opposite disks rotarily mounted on the pivots, and opposite fender plates connected at their front ends to the arms by the said pivots and extending rearwardly beyond the disks and co-acting with the same to prevent dirt from being thrown on the plants.

3. A fender for cultivators including inclined arms provided at their lower portions with pivots and having perforations at their lower ends, disks mounted on the pivots, fender plates connected with the arms by the said pivots and having perforate and imperforate portions and provided with opposite bolt openings adapted to register with the perforations at the ends of the arms, and removable bolts adapted to be arranged in the perforations of the arms and in the bolt openings of the fender plates for rigidly connecting the same with the arms.

In testimony, that I claim the foregoing as my own, I have hereto affixed my signature in the presence of two witnesses.

ARTHUR BRIGDEN.

Witnesses
M. F. CURRY,
D. K. SEARCY.